United States Patent                                                    [11] 3,632,332

[72] Inventor    Taizo Maeda
                 Tokyo, Japan
[21] Appl. No.   870,679
[22] Filed       Oct. 27, 1969
[45] Patented    Jan. 4, 1972
[73] Assignee    Kumial Chemical Industry Co., Ltd.
                 Tokyo, Japan
[32] Priority    Oct. 31, 1968
[33]             Japan
[31]             43/79549

[52] U.S. Cl. .................................................... 71/100,
                                                                     260/455
[51] Int. Cl. ..................................................... A01n 9/12
[50] Field of Search ......................................... 71/100

[56]                   References Cited
                  UNITED STATES PATENTS
2,992,091    7/1961    Harman et al. ...............    71/100

Primary Examiner—James O. Thomas, Jr.
Attorney—Stevens, Davis, Miller & Mosher

[54] HERBICIDAL COMPOSITION FOR SELECTIVELY KILLING UNDESIRABLE WEEDS IN PADDY RICE FIELDS AND A METHOD FOR USE THEREOF
2 Claims, No Drawings ABSTRACT: A herbicidal composition for selectively killing undesirable weeds in paddy rice fields comprises as an active ingredient a herbicidally effective amount of S-(4-methylbenzyl)-N,N-diethylthiocarbamate and a major portion of an inert diluent.

HERBICIDAL COMPOSITION FOR SELECTIVELY KILLING UNDESIRABLE WEEDS IN PADDY RICE FIELDS AND A METHOD FOR USE THEREOF

The present invention relates to herbicidal compositions for selectively killing undesirable weeds in paddy rice fields and methods of selectively killing undesirable weeds in paddy rice fields.

More particularly it relates to methods of killing undesirable weeds which comprise applying to paddy rice fields containing undesirable weeds S-(4-methylbenzyl)-N,N-diethylthiocarbamate, and inert diluent therefor, in an amount sufficient to kill weeds but insufficient to kill the rice plants.

The herbicidal compositions of the present invention comprise as an active ingredient a herbicidally effective amount of the above described methylbenzyl thiocarbamate, and a major portion of an inert diluent.

The methylbenzyl thiocarbamate according to the present invention is active as a herbicidal composition and has a high activity for controlling germination of various weeds in agricultural fields and particularly, said compound can prevent Wiregrass (*Eleocharis aicularis* Roem. et Sckulet), Barnyard grass (*Echinochloa crusgalli* P. Beauv) and Crabgrass (*Digitaria adscendens* Henr.), which are main noxious weeds in paddy rice fields.

It is known that trichlorobenzyl-N,N-dialkylthiocarbamate and dithiocarbamate can be used as preemergence and postemergence herbicidal compositions in the U.S. Pat. No. 2,992,091. However, these thiocarbamates and dithiocarbamates cannot be used as herbicidal compositions for paddy rice field.

It has now been found that methylbenzyl thiocarbamate according to the present invention show improved herbicidal properties. It distinguishes itself further by a nonphytotoxicity to paddy rice plant and a very good herbicidal action at minimum rates of application.

Herbicidal compositions applied previously to paddy rice field have involved PCP, NIP (4-nitro-2',4'-dichlorodiphenylether), 2-methylthio-4,6-bis(isopropylamino)-S-triazine and DBN (2,6-dichlro-benzonitrile) and other numerous compositions, but almost of them have been used for controlling germination of weeds after planted paddy rice plant. These previous herbicidal compositions are effective for therophyte weeds generated at a relatively early stage after planted the rice plant, but have extremely poor activity or substantially no activity for Wiregrass of perennial weed. Recently, this Wiregrass has become problem as preferential weed in paddy field, because any herbicidal composition, which has no phytotoxicity to paddy rice plant and can prevent exactly Wiregrass, has never been discovered.

The reason why, Wiregrass has been unusually grown in paddy field, is based on the fact that in general, the previous herbicidal compositions are spread 3 to 7 days after the rice plant is planted, while generation of Wiregrass is about 2 weeks after planted, that is Wiregrass is generated when the activity of the herbicidal compositions are decreased and further Wiregrass is perennial, so that it has high resistance against the herbicidal composition.

The most active composition for preventing Wiregrass has been DBN, but this composition is hugely phytotoxic against paddy rice plant, so that it has problem in practice.

However, the methylbenzyl thiocarbamate according to the present invention is excellent in the activity for preventing Wiregrass and particularly, when it is used in an original stage of growth of Wiregrass, Wiregrass is completely prevented in an amount of less than 500 grams per 10 ares. Particularly, when surface layer of soil or watered field is applied with 250 grams per 10 ares before germination of the weed, the growth of weeds, such as Wiregrass, Barnyard grass and Crabgrass, etc. can be prevented and paddy rice plant planted in a depth of more than 2 cm. is not damaged. When 800 to 1,000 grams per 10 ares are used, the growth is slightly suppressed temporarily but hereafter is not affected adversely and methylbenzyl thiocarbamate has substantially no damage.

Then, a method for producing methylbenzyl thiocarbamate according to the present invention will be explained in the following.

Two thousand grams of toluene containing 200 grams (2 mol) of phosgen was mixed with 276 grams (2 mol) of 4-chloromethylbenzyl mercaptan, and thereto was added dropwise a mixture of 210 grams of triethylamine and 300 grams of toluene while cooling with ice-common salt and stirring. This reaction was violently exothermic, but the resulting mass was maintained at a temperature below 5° C. After the addition, the temperature was returned to room temperature for 1 hour and further the reaction was continued at the same temperature for 1 hour. Then a mixture of 300 grams (4.1 mol) of diethylamine and 1,000 grams of toluene was added dropwise at room temperature while stirring. After the reaction was continued at room temperature for 5 hours, the resulting reaction product was washed with water, dehydrated on sodium sulfate anhydride, and then toluene was removed off therefrom by concentrating. The resulting residue was distilled in vacuo to obtain 316 grams of a yellow liquid having a boiling point of 107°–115° C/0.002 mmHg and a refractive index of $n_D^{17}$=1.5522. The yield was 67 percent.

Methylbenzyl thiocarbamate according to the present invention is mixed with inert diluents involving carriers and surfactants to prepare dust, emulsifiable concentrate and wettable powder, which are used directly or after diluted with water as herbicidal compositions.

Furthermore, said thiocarbamate can be prepared into granular composition. Namely said thiocarbamate is increased in amount with bentonite, clay, talc, lime stone, etc., and added with a binder, such as, PVA (polyvinyl alcohol) and the resulting mixture is kneaded with water and subjected to an extrusion type of granule-forming machine and the formed granules are dried.

Some examples are described hereinafter, but it is needless to say that amounts of active ingredient and carrier can be varied in a wide range.

EXAMPLE 1

Wettable powder

Twenty five parts by weight of S-(4-methylbenzyl)-N,N-diethylthiocarbamate, 10 parts by weight of white carbon, 60 parts by weight of diatomaceous earth and 5 parts by weight of wetting agent of a mixture of polyoxyethylene alkylphenol ether, polyoxyethylene phenylphenol ether and polyoxyethylene carbonate were mixed and milled and the resulting powder was suspended in water, which was sprayed.

EXAMPLE 2

Emulsifiable concentrate

Fifty parts by weight of S-(4-methylbenzyl)-N,N-diethylthiocarbamate, 30 parts by weight of xylene and 20 parts by weight of an emulsifier of a mixture of polyoxyethylene alkylphenol ether, polyoxyethylene phenylphenol ether and polyoxyethylene carbonate were mixed and dissolved. The resulting solution was diluted with water and then sprayed.

EXAMPLE 3

Granule

Five parts by weight of S-(4-methylbenzyl)-N,N-diethylthiocarbamate were sprayed on and adsorbed in 95 parts by weight of granular diatomaceous earth, which was being stirred and had 10 to 100 meshes.

In order to show the activity of the herbicidal composition of the present invention, Experimental examples are described as follows:

EXPERIMENTAL EXAMPLE 1

Three groups of 3leaf stage paddy rice plant (species; KINMAZE), one group of which has two rice plants, were planted in a pot of 15 cm. diameter. After the rice plant took, 30 Barnyard grass seeds per pot were sowed on the surface layer of the soil and the pot was filled with water to a depth of 1 cm. and 1 day later granular compositions containing 5 percent active ingredient of the present invention (example 2) were spread in such amounts that the amounts of active ingredient were 100 grams, 250 grams per 10 ares. Two weeks after the treatment, the growth degree of the weed and the phytotoxicity on the paddy rice plants were estimated.

| Active ingredients | Dose (g./10 a.) | Number of— barnyard grass | broadleaf | Phytotoxicity on paddy rice plant |
|---|---|---|---|---|
| S-(4-methylbenzyl)-N,N-diethyl-thiocarbamate. | 500 | 0 | 0 | No damage. |
| Do | 250 | 0 | 0 | Do. |
| Do | 100 | 1 | 1 | Do. |
| S-(2,4,5-trichlorobenzyl)-N,N-diethylthiocarbamate. | 500 | 14 | 16 | Do. |
| Do | 250 | 18 | 24 | Do. |
| Do | 100 | 25 | 29 | Do. |
| S-(2,6-dichlorobenzyl(-N,N-diethyldithiocarbamate. | 500 | 1 | 4 | Heavy damage. |
| Do | 250 | 5 | 9 | Slight damage. |
| Do | 100 | 7 | 15 | No damage. |
| Non-treated | | 28 | 33 | Do. |

EXPERIMENTAL EXAMPLE 2

A surface layer of paddy soil containing seeds of the weed was fed in a Wagner pot of 1/5000 are and stirred thoroughly therein. Then two groups of 2 to 3 leaf-stage paddy rice plant (species; KINMAZE), each of which being composed of two paddy rice plants, were transplanted in the pot, and on the next day a given amount of germinated Barnyard grass seeds (50 seeds per pot) was sowed thereon, and the pot was filled with water to a depth of 3 cm. and 3 days later a test solution obtained by diluting wettable powder of test compound shown in the following table with 10 cc. of water, were dropped on the pot by means of a pipette. Twenty days after the treatment, the herbicidal activity and the phytotoxicity on a paddy rice plant were determined.

Note:
Herbicidal activity:

| Active ingredients | Dose (g./10 a.) | Effectiveness on weeds | | | Phytotoxicity on paddy rice plant |
|---|---|---|---|---|---|
| | | A | B | C | |
| S-(4-methylbenzyl)-N,N-diethylthiocarbamate. | 100 | 5 | 4.5 | 3.5 | — |
| Do | 250 | 5 | 5 | 4 | — |
| Do | 500 | 5 | 5 | 5 | — |
| S-(3,4-dichlorobenzyl)-N,N-diisopropyldithiocarbamate (USP 2,992,091). | 100 | 0 | 0 | 0 | — |
| Do | 250 | 0 | 0 | 0 | — |
| Do | 500 | 0 | 0 | 0 | — |
| S-(4-chlorobenzyl)-N,N-diisopropyldithiocarbamate (USP 2,992,091). | 100 | 0 | 0 | 0 | — |
| Do | 250 | 0 | 0 | 0 | + |
| Do | 250 | 1 | 2 | 3 | ++ |

0 ..... No effect (the same growth as in nontreated area)
5 ..... Complete control Phytotoxicity:
— ..... No damage
+++ .... Severe damage (complete withering) A, B and C are respectively effectiveness on Barnyard grass, Wiregrass and broad leaf plant.

From the above described experimental examples, it will be seen that methyl benzylthiocarbamate according to the present invention is entirely different in herbicidal activity from the comparative compounds and can be used as herbicidal composition for paddy rice fields.

What is claimed is:

1. A method for killing grassy and broadleaf weeds in areas containing such weeds and rice plants which comprises applying to said areas and contacting said grassy and broadleaf weeds and said rice plants with a phytotoxic amount with respect to said weeds and a noninjurious amount with respect to said rice plants of S-(4-methylbenzyl)-N,N-diethylthiocarbamate.

2. A process of selectively destroying Wiregrass in a paddy field containing rice plants while not effectively damaging the rice plants which comprises contacting the rice plants and Wiregrass with a phytotoxic amount with respect to said weeds of S-(4-methylbenzyl)-N,N-diethylthiocarbamate, the amount of said compound being sufficient to destroy said weeds but not sufficient to effectively damage said rice plants.

* * * * *